April 15, 1952  R. G. PIETY ET AL  2,593,052
SEISMOMETER

Filed May 17, 1948  2 SHEETS—SHEET 1

INVENTOR.
R. G. PIETY
M. E. THOMAS
BY
*Hudson & Young*
ATTORNEYS

April 15, 1952  R. G. PIETY ET AL  2,593,052
SEISMOMETER
Filed May 17, 1948  2 SHEETS—SHEET 2
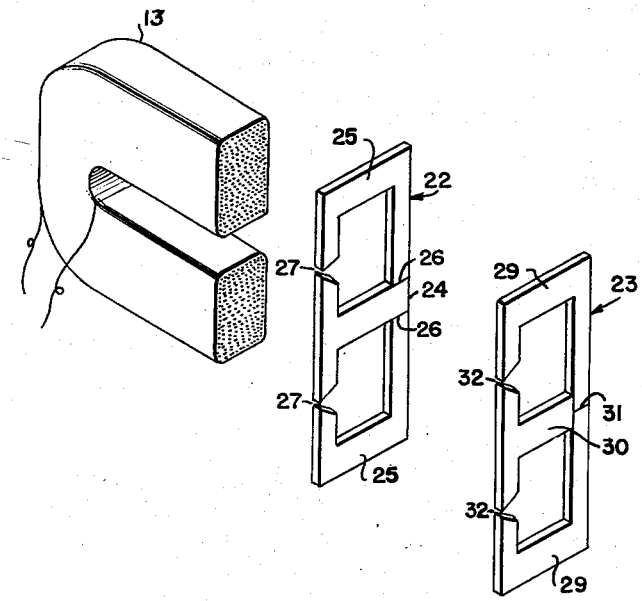
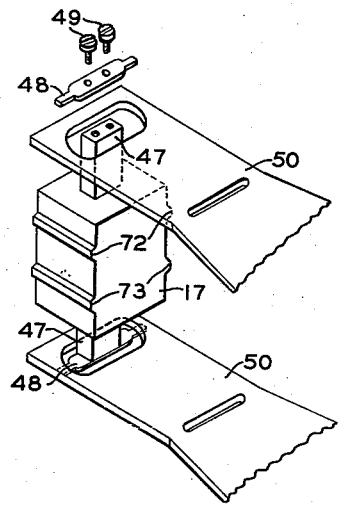
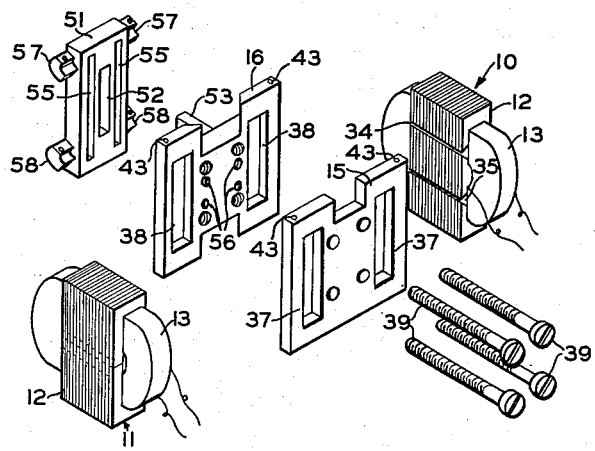
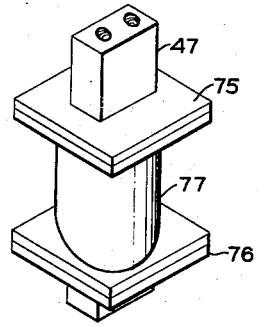
INVENTORS
R.G. PIETY
M.E. THOMAS
BY Hudson & Young
ATTORNEYS Patented Apr. 15, 1952

2,593,052

UNITED STATES PATENT OFFICE 2,593,052

SEISMOMETER

Raymond G. Piety and Marion E. Thomas, Bartlesville, Okla., assignors to Phillips Petroleum Company, a corporation of Delaware Application May 17, 1948, Serial No. 27,594

12 Claims. (Cl. 177—352)

1

This invention relates to a seismometer for converting seismic waves into electrical voltages representative thereof.

Heretofore, various structures have been proposed for seismometers in which the reluctance of a magnetic circuit is varied by earth movements and the resultant variable fluxes are interlinked with coils in which electrical voltages are generated which are representative of the earth movements. However, many difficulties have been encountered in the construction of such seismometers and elaborate mechanical devices have been necessary to obtain the requisite sensitivity and to prevent unwanted seismic disturbances from being picked up by the seismometer. This has necessitated the use of bulky structures which are correspondingly costly to manufacture and difficult to adjust.

It is an object of this invention to provide a very sensitive electric seismometer which is of extremely small size and simple construction.

It is a further object of the invention to provide a seismometer which is small enough to lower through well tubing of small diameter but which has a considerable fraction of the power output of larger seismometers.

It is a still further object of the invention to provide a seismometer in which the inertia body is mounted in a novel manner so that it is displaceable only in one direction by the seismic waves.

It is a still further object of the invention to provide a seismometer which is highly sensitive, of rugged construction, and capable of withstanding abuse in the field.

Various other objects, advantages and features of the invention will become apparent, from the following detailed description taken in conjunction with the accompanying drawings, in which:

Figure 3 is a perspective view of part of a coil unit with the parts in disassembled relation;

Figure 4 is a perspective view of the armature;

Figure 5 is a perspective view of the supports and dual coil unit with the parts in disassembled relation; and Figure 6 is a perspective view of a modified rotor construction.

Figure 1:
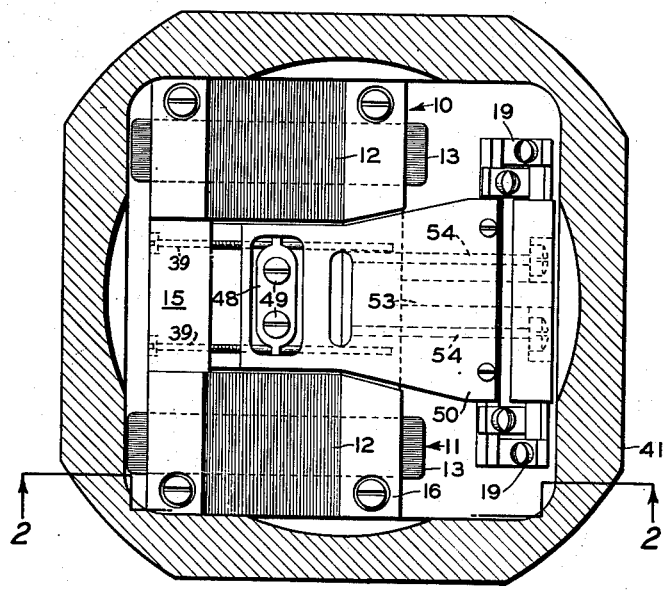
Figure 1 is a horizontal sectional view of a seismometer constructed in accordance with our invention.

Referring now to the drawings in detail, and particularly to Figures 1 and 5, the seismometer

Figure 2:
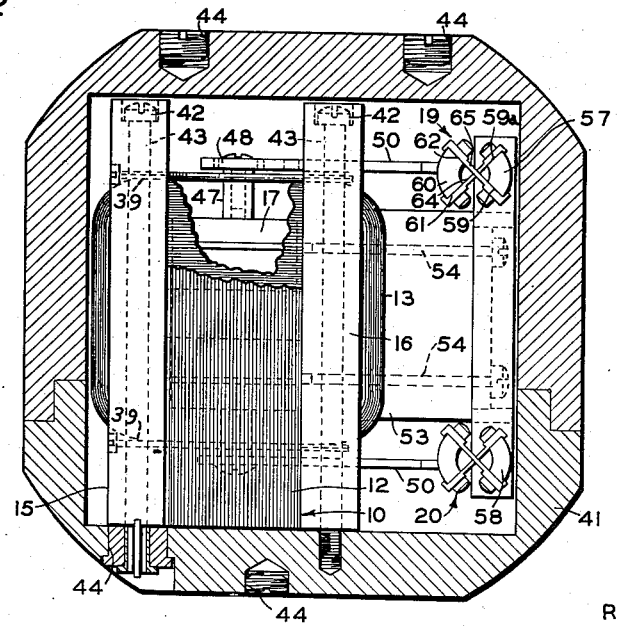
Figure 2 is a sectional view taken along the line 2—2 of Figure 1 with parts of the structure broken away to show the detailed construction.

2 of this invention comprises a pair of coil units 10 and 11, each of which includes a laminated core 12 having a coil 13 wound thereon. The coil units are firmly secured between a pair of plates 15, 16 and a vertically displaceable armature 17, Figures 2 and 4, is mounted between the coil units 10, 11 by two sets 19, 20 of spring suspension units, each set comprising two pairs of crossed flexure plate hinge members, Figure 1. Relative movement between the armature 17 and coil units 10, 11 due to seismic waves changes the self inductance of the coils 13 and induces electric voltages therein which are representative of the seismic waves incident upon the seismometer, as will be hereinafter explained in detail.

The detailed construction of the coil units 10, 11 is illustrated by Figure 3 from which it will be observed that the cores 12 are formed from laminations 22, 23 which are alternately stacked together and bonded by a suitable adhesive material. Each lamination 22 consists of a generally T-shaped central piece 24 and two identical generally U-shaped end pieces 25. The end pieces 25 engage the base of the central piece 24 along the respective lines 26 while the top portion of the T-shaped member 24 has tapered edges which cooperate with correspondingly tapered edges formed on the end pieces 25 to form gaps 27 of generally V-shaped configuration. The construction of the laminations 23 is generally similar to that of laminations 22 except that the end pieces 29 are elongated while the T-shaped central piece is shortened so that the end pieces 29 engage each other along a line 31 rather than engaging the central piece 30. The V-shaped gaps 32 defined by end pieces 29 and central piece 30 are aligned with the gaps 27 in the adjacent laminations 22 and these gaps are all of identical size and configuration. At the apex of the V, each of the gaps is approximately .005 inch wide. When a series of laminations 22, 23 are stacked together in alternating arrangement, two parallel gaps 34, 35 are thereby formed in the completed core and extend laterally thereof. It will also be apparent that a pair of spaced laterally extending openings are formed in the completed core when the laminations are assembled. The coil 13 is wound in these openings and forms an integral part of the completed units 10 and 11.

As previously stated, the coil units 10, 11 are mounted between the plates 15 and 16, Figures 1 and 5. To this end, a pair of generally rectangular openings 37 is provided in plate 15 for receiving the respective coils 13 and a similar set of openings 38 is provided in plate 16. Accordingly, when the coils are inserted into these openings and the plates are clamped together, as by screws 39, the laminations 12 may be very strongly compressed and the coil units are rigidly held in proper position between the plates 15 and 16. The plates, in turn, are rigidly secured to a two-section casing 41, Figure 2, by screws 42 which extend through longitudinal bores 43, Figure 5, in the plates. Preferably and advantageously, the casing is generally cubical in shape with rounded corners and is provided with tapped passages 44 for receiving a connection plug, and for attaching adaptors or fixtures thereto.

In accordance with the invention, the armature 17 is mounted for vertical movement between the laminated cores 12. In the present embodiment of the invention, the armature is of generally cubical configuration and is formed from magnetic material, such as Alnico 5, so that said armature supplies a magnetic flux for the surrounding coils 13 and cores 12. In other embodiments of the invention, as will appear in the following description, we contemplate that the armature 17 may consist of a core member having a coil wound thereon to which alternating current may be supplied to induce currents in the coils 13. Accordingly, in a generic sense, we contemplate that the armature shall include means for establishing a magnetic field in the cores with the result that relative movement between the armature and the cores varies said magnetic field thereby to change the magnetic flux linkage between the armature and the coils.

The armature is mounted by a novel spring suspension which permits vertical movement, Figure 2, of the casing with respect to the armature but which prevents relative rotational movement in a horizontal plane between these parts. Although there is rotation about the axes of spring suspension units 19 and 20, this rotation is negligible over the small distances of movement of the armature and, for all practical purposes, the movement of the armature is vertical. To this end, the armature is provided with non-magnetic extensions 47 at the top and bottom thereof, respectively, and each of these extensions is secured to a small plate 48 of spring material by screws 49. Each plate 48, in turn, is secured to a rigid arm 50 formed of aluminum and the two arms 50 are supported by the respective sets of spring suspensions 19 and 20, Figure 2. These spring suspension units are mounted upon a slidable plate 51, Figure 5, which has a recess 52 therein for receiving a tongue 53 extending from and formed integrally with the plate 16. The plates 16, 51 are secured together by screws 54, Figures 1 and 2, which extend through slots 55 in plate 51 into tapped openings 56 in plate 16.

A pair of studs 57 protrude from the top portion of the plate 51 and a pair of studs 58 protrude from the bottom portion of plate 51. These studs support the respective sets of flexure plate hinge members 19 and 20. Since each hinge unit is identical with the others, only one need be described in detail. Referring again to Figure 2, it will be noted that the studs 57 have inclined surfaces 59, 59a which are perpendicular to each other and which define an angle of 45 degrees with respect to the axis of armature 17. Rigid arm 50 carries a similar stud 60 having inclined surfaces 61, 62 which, likewise, are perpendicular to each other and define an angle of 45 degrees with respect to the armature 17. A resilient elongated hinge 64 is suitably secured to the surfaces 59a, 61 and a similar hinge 65 is secured to the surfaces 59 and 62. Accordingly, the crossed hinges are perpendicular to each other and, like the surfaces which support them, define an angle of 45 degrees with respect to the axis of the armature. A similar hinge unit is carried by the other stud 57 and by each of the studs 58 so that each arm 50 is supported by two of the described, crossed flexure plate hinge units.

With the flexure plate hinges mounted in the manner described, vertical movement of the armature is permitted but transverse movement thereof in such direction as to allow contact or friction with the cores 12 is effectively prevented. Similarly, the spring plates 48 permit relative vertical movement between the casing and armature but prevents transverse movement of the armature toward and away from the cores 12. This results from the fact that such displacement places the spring 48 in tension, the strength of such a plate in tension being extremely high. Spring plates 48 also effectively prevent rotational movement of the armature about its vertical axis.

When the armature 17 is mounted in assembled position between the cores 12, its upper and lower ends are very closely spaced to the screws 39. Accordingly, if relative movement of a greater magnitude than a few thousandths of an inch occurs between the casing and the armature, the ends of the armature engage the screws 39 and further movement is prevent. This prevents a displacement of sufficient magnitude as to exceed the elastic limits of the spring suspension, should the seismometer receive unusual abuse during operation in the field.

As previous stated, the spring suspensions bias the armature to a position wherein its ends are midway between the screws 39. In this position, two sets 72, 73 of protrusions formed on the armature 17 are closely spaced to the respective core gaps 34 and 35. As a result, relative vertical movement between the armature and the casing, that is between the armature and coil units 10 and 11, causes an electric voltage to be induced in the coils 13 and this induced voltage is proportional to the velocity of movement of the cores with respect to the armature. In this connection, it will be understood that, when the casing is subjected to seismic waves, it moves vertically with respect to the armature which tends to occupy a stationary position due to inertia.

The combination employed in our invention permits a pulse power output to be obtained of about one-half that of known seismometers from an instrument having approximately one-seventh the normal mass and capable of being lowered through the tubing having as small a diameter as 2¼ inches while oriented in any direction. The use of a permanent magnet armature suspended by the crossed flexure plate hinges 19, 20 having a strong horizontal stiffness compared to a small vertical stiffness are very important in obtaining the desired results. The small vertical stiffness is further decreased, in accordance with the invention, by the small thin attachment plate 48 soldered or welded to each arm 50.

As previously noted, the voltage induced in the coils 13 is proportional to the velocity with which relative movement occurs between the armature and the coil units 10 and 11. When these parts are stationary, there is no change in flux linkage between the armature and the coils with the result that no current is produced. When relative movement occurs, the flux linkage changes and this change is, of course, proportional to the speed of the relative movement with the result that the induced current is proportional to the velocity of said relative movement. However, in many cases, it is desirable that the current induced in coils 13 shall be proportional to the displacement of the armature from the predetermined position to which it is biased by the spring suspensions 19 and 20, rather than to the velocity with which such displacement occurs.

In accordance with the invention, we accomplish this result by substituting a coil for the permanent magnet of armature 17 and we supply this coil with alternating current while the seismometer is operating. A suitable construction for effecting this result is shown by Figure 6 as including a pair of spaced ferromagnetic plates 75, 76 which are adapted for alignment with the respective gaps 34, 35 in the coil units 10 and 11. The plates 75, 76 are secured in spaced position by a paramagnetic core, not shown, and each plate is provided with a non-magnetic extension 47 similar to that described in connection with Figure 4. In this modification of the invention, it is desirable that the ferromagnetic sections both of the armature and the cores 12 be made from laminated high permeability material or from a so-called dust core material.

A coil 77 is wound about the ferromagnetic core of the modified armature and this coil is adapted to be supplied with alternating current from a suitable source, not shown. When the armature is mounted between the arms 50 in the manner shown by Figure 4, it is biased to a position wherein the plates 75, 76 are directly opposite the gaps 34 and 35, respectively. When the armature is centered in this manner, the flux linkage between the armature coil 77 and coils 13 is such that no current is induced in the latter coils. However, if the units 10, 11 are displaced relative to the armature due to seismic waves incident upon the seismometer, the plates 75, 76 are vertically displaced, Figure 2, so that the flux linkage is changed, and a voltage is induced in the coils 13 which is proportional to the relative displacement between the armature and the units 10 and 11. It will be noted that such displacement changes the mutual inductance between the armature coil 77 and the coils 13 so that a voltage is induced which is proportional to the displacement of the armature from the central position to which it is biased by the spring suspensions 19 and 20. It will be apparent, therefore, that the combination of this invention is adapted for use both in a velocity type seismometer and in a displacement type seismometer.

While the invention has been described in connection with present, preferred embodiments thereof, it is to be understood that this description is illustrative only and is not intended to limit the invention, the scope of which is defined by the appended claims.

Having described our invention, we claim:

1. A seismometer comprising, in combination, a pair of paramagnetic cores, each including a series of stacked generally rectangular laminations constructed and arranged to define a pair of spaced air gaps along one side thereof, a coil wound on each of said cores, means supporting said cores in aligned, spaced relation so that said air gaps are in facing position, an armature disposed between said cores and having paramagnetic portions protruding therefrom which are closely adjacent the respective air gaps, a plurality of spring suspension units mounting said armature for longitudinal movement with respect to said cores and biasing said armature to a position wherein said protruding portions are at their closest spacing to said air gaps, said suspension units preventing transverse movement of the armature toward or away from said cores, means limiting the longitudinal movement of said armature, and means on said armature for establishing magnetic circuits including the respective cores and the protruding armature portions associated therewith whereby relative movement between said armature and said cores produces a change in said magnetic field thereby to vary the magnetic flux linkage between each of said cores and the coil associated therewith.

2. A seismometer comprising, in combination, a pair of paramagnetic cores, each including a series of stacked generally rectangular laminations constructed and arranged to define a pair of spaced air gaps along one side thereof, a coil wound on each of said cores, means supporting said cores in aligned, spaced relation so that said air gaps are in facing position, an armature disposed between said cores and having paramagnetic portions protruding therefrom which are closely adjacent the respective air gaps, a plurality of spring suspension units mounting said armature for longitudinal movement with respect to said core and biasing said armature to a position wherein said protruding portions are at their closest spacing to said air gaps, said suspension units preventing transverse movement of the armature toward or away from said cores, means limiting the longitudinal movement of said armature, and a permanent magnet forming a part of said armature for establishing a magnetic field in each of said cores whereby relative movement between said armature and said cores varies said magnetic field, thereby to induce voltage in both of said coils which is proportional to the velocity of said movement.

3. A seismometer comprising, in combination, a pair of paramagnetic cores, each including a series of stacked generally rectangular laminations constructed and arranged to define a pair of spaced air gaps along one side thereof, a pickup coil wound on each of said cores, means supporting said cores in aligned, spaced relation so that said air gaps are in facing position, an armature disposed between said cores and having paramagnetic portions protruding therefrom which are closely adjacent the respective air gaps, a plurality of spring suspension units mounting said armature for longitudinal movement with respect to said cores and biasing said armature to a predetermined position wherein said protruding portions are at their closest spacing to said air gaps, said suspension units preventing transverse movement of the armature toward or away from said cores, means limiting the longitudinal movement of said armature, a coil wound on said armature, and means for supplying an alternating voltage to said armature coil thereby to produce an alternating voltage in said pickup coils which is proportional to the displacement of said armature from the predetermined position to which it is biased by said spring suspension units.

4. A seismometer comprising, in combination, a paramagnetic core, a coil wound thereon, an armature closely spaced to said core, two sets of spring suspensions secured, respectively, to the top and bottom portions of said armature to support it for rectilinear movement with respect to said core, each set including a rigid arm, means forming a yielding connection between said arm and said armature, a support, and a set of crossed, mutually perpendicular flexure plate hinges mounting said arm upon said support, each plate being positioned at an angle of 45° relative to the direction of relative rectilinear movement between said armature and said core, so that transverse movement of the armature toward and away from said core is prevented, and means on said armature for establishing a magnetic field in said core whereby relative movement between said armature and said core varies said magnetic field thereby to change the magnetic flux linkage between said armature and said coil.

5. A seismometer comprising, in combination, a paramagnetic core, a coil wound thereon, an armature closely spaced to said core, two sets of spring suspensions secured, respectively, to the top and bottom portions of said armature to support it for rectilinear movement with respect to said core, each set including a rigid arm, means forming a yielding connection between said arm and said armature, a support, and a set of crossed, mutually perpendicular flexure plate hinges mounting said arm upon said support, each plate being positioned at an angle of 45° relative to the direction of relative rectilinear movement between said armature and said core, so that transverse movement of the armature toward and away from said core is prevented, and a permanent magnet forming a part of said armature for establishing a magnetic field in said core whereby relative movement between said armature and said core varies said magnetic field and induces a voltage in said coil which is proportional to the velocity of said movement.

6. A seismometer comprising, in combination, a paramagnetic core, a coil wound thereon, an armature closely spaced to said core, two sets of spring suspensions secured, respectively, to the top and bottom portions of said armature to support it for rectilinear movement with respect to said core, each set including a rigid arm, means forming a yielding connection between said arm and said armature, a support, and a set of crossed, mutually perpendicular flexure plate hinges mounting said arm upon said support, each plate being positioned at an angle of 45° relative to the direction of relative rectilinear movement between said armature and said core, so that transverse movement of the armature toward and away from said core is prevented, and a coil wound on said armature whereby an alternating voltage impressed upon said armature coil induces a corresponding voltage in said pickup coil which is proportional to the displacement of said armature from said core.

7. A seismometer comprising, in combination, a paramagnetic core, a coil wound thereon, an armature closely spaced to said core, two sets of spring suspensions supporting, respectively, the upper and lower portions of said armature, each suspension including a rigid arm having a recessed portion formed therein, an elongated spring mounted in said recessed portion and secured at both ends to said arm, means for securing said armature to said spring whereby rotational movement of the armature is prevented, and a set of flexure plate hinges for mounting said arm so as to prevent transverse movement of the armature toward and away from said core, and means on said armature for establishing a magnetic field in said core whereby relative movement between said armature and said core varies with magnetic field thereby to change the magnetic flux linkage between said armature and said coil.

8. A seismometer comprising, in combination, a paramagnetic core, a coil wound thereon, an armature closely spaced to said core, two sets of spring suspensions supporting, respectively, the upper and lower portions of said armature, each suspension including a rigid arm having a recessed portion formed therein, an elongated spring mounted in said recessed portion and secured at both ends to said arm, means for securing said armature to said spring whereby rotational movement of the armature is prevented, and a set of flexure plate hinges for mounting said arm so as to prevent transverse movement of the armature toward and away from said core, and a permanent magnet forming a part of said armature for establishing a magnetic field in said core whereby relative movement between said armature and said core varies said magnetic field and induces a voltage in said coil which is proportional to the velocity of said movement.

9. A seismometer comprising, in combination, a paramagnetic core, a coil wound thereon, an armature closely spaced to said core, two sets of spring suspensions supporting, respectively, the upper and lower portions of said armature, each suspension including a rigid arm having a recessed portion formed therein, an elongated spring mounted in said recessed portion and secured at both ends to said arm, means for securing said armature to said spring whereby rotational movement of the armature is prevented, and a set of flexure plate hinges for mounting said arm so as to prevent transverse movement of the armature toward and away from said core, and a coil wound on said armature whereby an alternating voltage impressed upon said armature coil induces a corresponding voltage in said pickup coil which is proportional to the displacement of said armature from said core.

10. A seismometer comprising, in combination, a paramagnetic core, a coil wound thereon, an armature closely spaced to said core, two sets of spring suspensions supporting, respectively, the upper and lower portions of said armature, each suspension including a rigid arm having a recessed portion formed therein, an elongated spring mounted in said recessed portion and secured to both ends to said arm, means for securing said armature to said spring whereby rotational movement of the armature is prevented, and a set of flexure plate hinges for mounting said arm so as to prevent transverse movement of the armature toward and away from said core, and means for establishing a magnetic field in said core whereby relative movement between said armature and said core varies said magnetic field thereby to change the magnetic flux linkage between said armature and said coil.

11. A seismometer comprising, in combination, a pair of paramagnetic cores, each including a series of stacked generally rectangular laminations constructed and arranged to define a pair of spaced air gaps along one side thereof, a coil wound on each of said cores, the ends of each coil protruding beyond the ends of its associated core, a pair of plates arranged in parallel formation, each plate having a pair of openings formed therein for receiving the protruding ends of the respective coils, a plurality of bolts to force said plates into engagement with the respective cores, an armature disposed for vertical movement between said cores, said bolts being arranged to limit the aforesaid vertical movement of said armature, paramagnetic portions protruding from said armature which are closely adjacent the respective air gaps, a plurality of spring suspension units mounting said armature for longitudinal movement with respect to said cores and biasing said armature to a position wherein said protruding portions are at their closest spacing to said air gaps, said suspension units preventing transverse movement of the armature toward or away from said cores, and means for establishing magnetic circuits including the respective cores and the protruding armature portions associated therewith whereby relative movement between said armature and said cores produces a change in said magnetic field thereby to vary the magnetic flux linkage between each of said cores and the coil associated therewith.

12. A seismometer comprising, in combination, a pair of paramagnetic cores, each including a series of stacked generally rectangular laminations constructed and arranged to define a pair of spaced air gaps along one side thereof, a coil wound on each of said cores, the ends of each coil protruding beyond the ends of its associated core, a pair of plates arranged in parallel formation, each plate having a pair of openings formed therein for receiving the protruding ends of the respective coils, a plurality of bolts to force said plates into engagement with the respective cores, an armature disposed for vertical movement between said cores, said bolts being arranged to limit the aforesaid vertical movement of said armature, a pair of paramagnetic portions protruding from said armature which are closely adjacent the respective air gaps, a tongue extending from one of said plates, a support having a slot therein for receiving said tongue, means for securing said support to the last mentioned plate in spaced relationship thereto, two sets of vertically spaced crossed flexure plate hinge units carried by said support, a rigid arm extending from each flexure plate unit to said armature, means resiliently securing each arm to said armature, and means on said armature for establishing magnetic circuits including the respective cores and the protruding armature portions associated therewith whereby relative movement between said armature and said cores produces a change in said magnetic field thereby to vary the magnetic flux linkage between each of said cores and the coil associated therewith.

RAYMOND G. PIETY.
MARION E. THOMAS.

REFERENCES CITED

The following references are of record in the file of this patent:

UNITED STATES PATENTS

| Number | Name | Date |
|---|---|---|
| 2,272,984 | Ritzmann | Feb. 10, 1942 |
| 2,286,386 | Silverman | June 16, 1942 |
| 2,297,251 | Schild | Sept. 29, 1942 |
| 2,303,413 | Washbun | Dec. 1, 1942 |
| 2,348,225 | Petty | May 9, 1944 |
| 2,390,328 | Roberts | Dec. 4, 1945 |

OTHER REFERENCES

A Study of Some Seismometers. Irland, Bureau of Mines Technical Paper 556, pp. 10-14.